(12) United States Patent
Silva et al.

(10) Patent No.: US 6,419,974 B1
(45) Date of Patent: Jul. 16, 2002

(54) DAIRY PRODUCTS AND METHOD OF PREPARATION

(75) Inventors: Ellen M. Silva, Minnetonka; Mayank T. Patel, Maple Grove; James McGuire, Crystal; Timothy T. Johnson, St. Anthony Village, all of MN (US)

(73) Assignee: General Mills, Inc., Minneapolis, MN (US)

( * ) Notice: Subject to any disclaimer, the term of this patent is extended or adjusted under 35 U.S.C. 154(b) by 20 days.

(21) Appl. No.: 09/711,088

(22) Filed: Nov. 14, 2000

Related U.S. Application Data

(62) Division of application No. 09/321,771, filed on May 27, 1999, now Pat. No. 6,183,802.

(51) Int. Cl.$^7$ ............................................. A23C 9/123
(52) U.S. Cl. ........................... 426/580; 426/34; 426/39; 426/40; 426/41; 426/42; 426/43; 426/74; 426/321; 426/583
(58) Field of Search ............................. 426/34, 39, 40, 426/41, 42, 43, 74, 321, 580, 583

(56) References Cited

U.S. PATENT DOCUMENTS

| | | | |
|---|---|---|---|
| 4,430,349 A | | 2/1984 | Malone et al. |
| 5,096,718 A | * | 3/1992 | Ayres et al. .................. 426/9 |
| 5,449,523 A | | 9/1995 | Hansen et al. |
| 5,989,612 A | * | 11/1999 | King et al. .................. 426/335 |

FOREIGN PATENT DOCUMENTS

| | | |
|---|---|---|
| DE | 4442162 | 4/1996 |
| EP | 471904 | 2/1992 |

* cited by examiner

Primary Examiner—Helen Pratt
(74) Attorney, Agent, or Firm—John A. O'Toole; Douglas J. Taylor; Everett G. Diederiks, Jr.

(57) ABSTRACT

Refrigerated cultured dairy products such as yogurt having enhanced anti-mold stability are prepared by including minute quantities of a cultured dairy ingredient having been cultured with a propionic acid forming culture. The propionic bearing cultured dairy ingredient such as whey is added to a milk base that is then heat treated prior to inoculation and fermentation with a yogurt culture. Premature protein coagulation that can occur during the heat treatment step is minimized by adding minute quantities of a calcium sequestrant to the milk base.

5 Claims, 1 Drawing Sheet

DAIRY PRODUCTS AND METHOD OF PREPARATION

This application represents a divisional of application Ser. No. 09/321,771, filed May 27, 1999, now U.S. Pat. No. 6,183,802.

FIELD OF THE INVENTION

The present invention relates to food products and to their methods of preparation. More particularly, the present invention relates to dairy products, especially cultured dairy products and to their methods of preparation.

BACKGROUND

The present invention provides improvements in dairy products especially cultured dairy products such as yogurt that themselves contain cultured dairy ingredients such as cultured whey and to methods of preparing such improved cultured dairy products and methods for preparing such cultured dairy ingredients.

The improvement resides in part in the preparation of an improved cultured dairy ingredient intermediate product such as whey and the utilization of this improved cultured whey intermediate product in the preparation and formulation of finished cultured dairy products.

Cultured dairy products such as yogurt, cottage cheese, sour cream, kefir, buttermilk, etc., often contain various specialty dairy ingredients, e.g. whey, non-fat dry milk, whey protein concentrate solids, etc. These specialty dairy products themselves can be cultured dairy ingredients. These cultured dairy ingredients are intermediate products that possess various desirable qualities such as flavor, thickening power, nutrition, specific microorganisms and other properties such as mold growth control.

In particular, extended shelf life of refrigerated cultured dairy products such as yogurt is of considerable commercial interest. Mold is an important cause of spoilage.

Cultured dairy product preparation typically involves a heat treatment to destroy undesirable organism prior to inoculation with the desired active culture.

Additionally, mold spoilage control can involve addition of components to inhibit mold growth during extended refrigerated storage. For example, a chemical preservative such as potassium sorbate or propionic acid can be added by direct addition of the active chemical. While useful, the added sorbate must be declared on the product's ingredient statement. Consumers who prefer "natural" products find inclusion of such added chemicals such as chemical preservatives as being undesirable.

Mold spoilage control can also involve the inoculation of the cultured dairy product with selected bacterial cultures that inhibit mold growth. (See, for example, U.S. Pat. No. 4,728,516 entitled "Method for the Preservation of Creamed Cottage Cheese" issued Mar. 1, 1999 to Boudreaux et al.) Mold spoilage control can also involve adding a naturally derived non-viable, anti-microbial ingredient to the cultured dairy product. This ingredient can be declared as a natural ingredient on the finished product ingredients label.

For example, cultured whey ingredients are commercially available that contain propionic acid and these ingredients are typically used for mold growth control in baked goods. These are not usually sold for dairy products due to the premature coagulation problem solved by the present invention Whey or other dairy ingredients are inoculated with a culture that produces propionic acid and cultured to desired acid levels and optionally dried to a powder. A good description of preparing a cultured whey is given, for example, in U.S. Pat. No. 2,465,905 (issued Mar. 29, 1949 to Meade et al.) entitled "Process of Making Whey Food Products".

During the fermentation of cultured dairy ingredients such as whey for the production of ingredients containing propionic acid, calcium hydroxide is added to neutralize the acidity resulting from fermentation. For example, by preventing the pH from dropping below 6.5, fermentation can be continued to produce higher levels of propionic acid. When the cultured whey with high propionic acid levels is dried, however, the total calcium level in the ingredient can be quite high, e.g., about 15,000 mg/100 g.

An unfortified six ounce (170 g) serving of a low fat yogurt provides only approximately 200 to 400 mg of calcium. The milk blend or milk base used to prepare yogurt is very sensitive to additional ionic calcium fortified prior to pasteurization.

The process of heat coagulation of milk proteins is not entirely understood, though experts in the field concur that ionic calcium plays an integral role. For example, the high levels of calcium in the milk base can cause undesirable premature coagulation of dairy proteins upon heat treatment prior to inoculation in the preparation of yogurt. The problem of premature coagulation of a heat treated milk base is even more severe when milk bases containe condensed milk diluted to regular strength with tap water containing dissolved calcium and magnesium. For this reason, post pasteurization and fermentation addition of calcium is taught to be useful (See for example, U.S. Pat. No. 5,820,903 entitled "Calcium Fortified Yogurt and Methods of Preparation" issued Oct. 13, 1998 to Fluery et al. which is incorporated herein by reference). Thus, addition of the desirable propionic bearing cultured whey ingredient is severely limited since even addition of even modest levels can raise calcium concentrations to levels that can cause premature coagulation. This extremely high ionic calcium level ingredient can profoundly adversely affect the preparation methods for the cultured dairy products containing the cultured dairy ingredient.

Surprisingly, the present invention provides improved cultured dairy products containing high calcium content cultured dairy ingredients that are less susceptible to premature coagulation and provides methods of preparing such improved dairy products.

The present invention further provides improved cultured dairy ingredients having high levels of calcium, especially soluble calcium, that nonetheless minimize premature coagulation of dairy proteins.

The improvement resides in part in the fortification of the cultured dairy ingredients with defined levels of calcium sequestrants especially by blending in dry form.

The present invention further provides cultured dairy ingredients having high levels of calcium, especially soluble calcium, that nonetheless minimize premature coagulation of dairy proteins, and that can contain high levels of propionic acid.

The present invention also provides methods for preparing such cultured dairy ingredients.

The present invention further provides cultured dairy products exhibiting longer refrigerated shelf life that contain cultured dairy ingredients that provide increased mold resistance.

The present invention further provides improved pasteurized milk blends that are useful in the preparation of cultured dairy products which are resistant to mold growth and which blends are resistant to premature coagulation.

The present invention further provides methods for inhibiting psychrotrophic bacteria and mold in refrigerated cultured dairy products using cultured dairy ingredients containing high levels of calcium, especially soluble calcium, and containing high levels of propionic acid.

The present invention further provides methods that are simple and economical and which are regarded as natural as opposed to chemical for the inhibition of mold growth in cultured dairy products.

The present invention also contains cultured dairy ingredients that provide increased mold resistance and that are high in highly bioavailable calcium levels to provide higher calcium nutrition and which are organoleptically superior even in the absence of an added fruit sauce.

The present invention provides cultured dairy products resistant to premature coagulation containing high calcium content cultured dairy ingredients that have been cultured with nonpropionic generating starter cultures.

These and other objects will become increasingly apparent by reference to the following description.

SUMMARY OF THE INVENTION

In one product aspect, the present invention resides in improved cultured dairy products containing the present improved fortified high calcium cultured dairy ingredients. The improved cultured dairy products comprise a cultured dairy base that includes a cultured dairy ingredient. The cultured dairy ingredient has a total calcium content of about 10% to 25% (dry weight basis). The dairy base further includes a calcium sequestrant in a weight ratio of cultured dairy ingredient to calcium sequestrant of about 1.5 to 10:1.

In another product aspect, the present invention resides in improved cultured dairy ingredients suitable for use in cultured dairy products that are high in calcium levels yet nonetheless minimize adverse dairy protein coagulation.

The improved cultured dairy ingredient product, comprises a cultured dairy ingredient having a native calcium content and having sufficient amounts of calcium hydroxide to have a pH of greater than 6 prior to drying to provide a total calcium content of about 10% to 25% (dry weight basis). The cultured dairy ingredient further includes a calcium sequestrant wherein the weight ratio of total calcium content in the cultured dairy ingredient (dry weight basis) to calcium sequestrant ranges from about 0.1:1 to 0.75:1.

The present invention further provides methods for preparing the fortified cultured dairy ingredient. The methods comprise the steps of:

admixing a cultured dairy ingredient having a native calcium content and having sufficient amounts of calcium hydroxide to have a pH of greater than 6 prior to drying to provide a total calcium content of about 10% to 25% (dry weight basis); and a calcium sequestrant wherein the weight ratio of cultured dairy ingredient (dry weight basis) to calcium sequestrant ranges from about 1.5:1 to 10:1 to provide a high calcium content cultured dairy ingredient fortified with calcium sequestrants.

In still another product aspect of one and the same invention, improved heat treated dairy bases are provided that are suitable for use as a starting material in the preparation of cultured dairy products. The improved dairy bases comprise: a dairy base, said base including a cultured dairy ingredient. The cultured dairy ingredient has a total calcium content of about 10% to 25% (dry weight basis). The cultured dairy ingredient further includes a calcium sequestrant in a weight ratio of cultured dairy ingredient to calcium sequestrant of about 1.5 to 10:1.

In still another product aspect of one and the same invention, the present invention resides in improved methods of preparing a heat treated dairy base intermediate product suitable for use in preparing refrigerated cultured dairy products. The methods comprise a first step of providing a lactose bearing cultured dairy ingredient selected from the group consisting of milk, whey, caseinate, buttermilk and mixtures thereof having sufficient amounts of calcium hydroxide to have a pH of greater than 6 to 7.5. The methods comprise a second step of providing a calcium sequestrant wherein the weight ratio of cultured dairy ingredient (dry weight basis) to calcium sequestrant ranges from about 3:1 to 1:1.

In another process aspect, the present invention resides in methods for preparing dairy products containing cultured dairy ingredients and a calcium sequestrant.

DETAILED DESCRIPTION OF THE INVENTION

Figure 1:
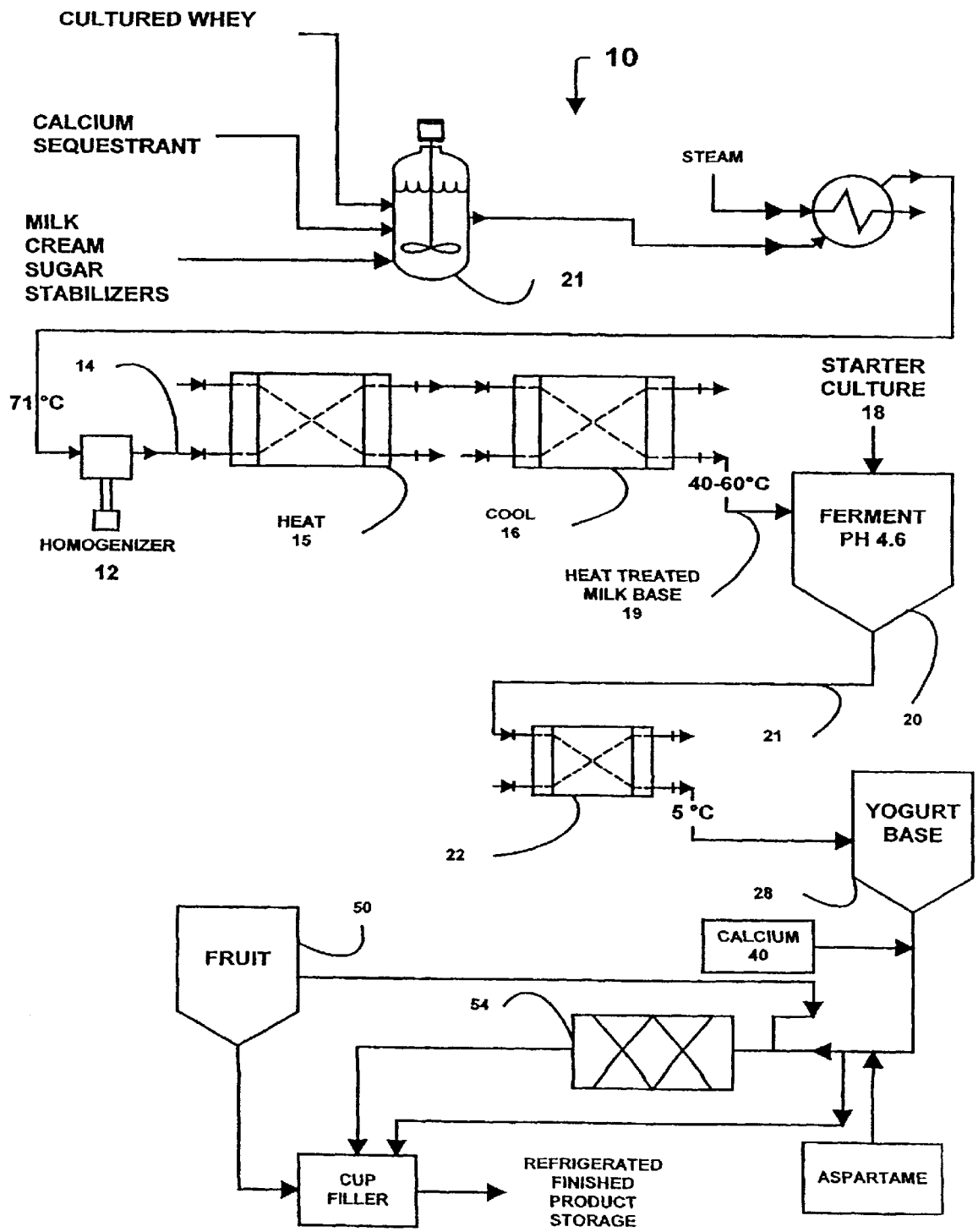
FIG. 1 is a schematic process flow diagram of a preferred embodiment of methods for preparing an improved cultured dairy product of the present invention.

The present invention relates to improved dairy products especially cultured dairy products such as yogurt containing cultured dairy ingredients such as cultured whey and to methods of preparing such improved cultured dairy products and methods for preparing such cultured dairy ingredients. Each of these product components as well as methods of preparation, product use and attributes are described in detail below.

Throughout the specification and claims, percentages are by weight and temperatures in degrees Fahrenheit unless otherwise indicated.

Referring now to the drawing, FIG. 1 depicts, in a highly preferred embodiment, methods for preparing a cultured dairy product are generally designated by reference numeral 10.

Conveniently, method 10 comprises the steps of providing a dairy base mix 11, optionally homogenizing the dairy base mix 12, heat treating the homogenized dairy base mix 14, bringing the pasteurized dairy base mix to fermenting temperatures 16 such as by cooling, adding a starter culture 18, and fermenting to desired acidities 20.

Briefly, the process typically begins with forming or providing a dairy base mix comprising at least one fermentable dairy ingredient. The fermentable dairy ingredient can comprise raw milk but can contain a combination of whole milk, skim milk, condensed milk, dry milk (dry milk solids non-fat or, equivalently, "MSNF"), grade A whey, cream and/or such other milk fraction ingredients as buttermilk, whey, lactose, lactalbumins, lactoglobulins, or whey modified by partial or complete removal of lactose and/or minerals, other dairy ingredients to increase the nonfat solids content, which are blended to provide the desired fat and solids content. While not preferred, the milk base can include a filled milk component, i.e., a milk ingredient having a portion supplied by a non-milk ingredient, e.g., oil or soybean milk.

While in the present invention, particular emphasis is directed towards fermented bovine milk products such as yogurt, the skilled artisan will appreciate that the present invention is also suitable for use in a wide variety of pasteurized dairy products, particularly fermented dairy products such as kefir, sour cream and the like.

Also, while bovine milk is preferred, other milks can be used in substitution for bovine milk whether in whole or in part, e.g., camel, goat, sheep or equine milk. In less preferred embodiments, the base mix can comprise a vegetable milk such as soy milk.

The dairy base can further include sweeteners. The dairy base mix can optionally further comprise a nutritive carbohydrate sweetening agent(s). Exemplary useful nutritive carbohydrate sweetening agents include, but are not limited to, sucrose, high fructose corn syrup, dextrose, various DE corn syrups, beet or cane sugar, invert sugar (in paste or syrup form), brown sugar, refiner's syrup, molasses (other than blackstrap), fructose, fructose syrup, maltose, maltose syrup, dried maltose syrup, malt extract, dried malt extract, malt syrup, dried malt syrup, honey, maple sugar, except table syrup and mixtures thereof.

Conveniently, the milk ingredients and sweeteners (such as fructose, corn syrup, sucrose) can be blended in a mix tank 21. Stabilizers and thickeners such as starch, gelatin, pectin, agar and carrageenan may also be added if desired.

Importantly, the dairy base mix essentially comprises at least one cultured dairy ingredient. Preferred for use herein are cultured dairy ingredients having been cultured with Propionibacteria such as to have antimycotic metabolic byproducts such as propionic acid. Such products are commercially available and are described in, for example, U.S. Pat. No. 4,676,987 (issued Jun. 30, 1987 to Ahern et al entitled "Production of Fermented Whey Containing Calcium Propionate" which is incorporated herein by reference).

Preferred for use herein is a cultured whey having a propionic acid content of about 10 to 40% and a calcium content of about 10 to 25%. In the preferred embodiment, minute quantities of the cultured dairy ingredient are added to the dairy base mix in order to provide the benefit of extended resistance to mold growth.

For propionic bearing cultured dairy ingredients good results are obtained when the dairy base mix contains about 0.05 to 0.3% of the cultured dairy ingredient. In more preferred embodiments, the cultured dairy ingredient with propionic acid is the only antimycotic and the dairy base mix is free of added sodium or potassium sorbate or benzoate.

In still other variations, a cultured dairy ingredient can be provided having other desirable functionality but not containing propionic metabolites from propionibaccilum. For example, whey cultured with various Lactobacillus spp. so that natural antibiotics such as bacteriocins are produced with the desired effect being shelf-life preservation in the end product. In still other variations, whey cultured with various exopolysaccharide-producing lactic acid bacteria, such as certain strains of *Lactococcus lactis* ssp. *cremoris,* with texture enhancement of a subsequently pasteurized dairy product being the desired effect.

While in the preferred embodiment, the present invention provides dairy products containing cultured whey having antimycotic activity, the present invention also finds usefulness in providing dairy products containing cultured dairy ingredients having other desirable properties such as flavor, thickening power and the like. As a result, such dairy products can contain higher levels of such cultured dairy ingredients and can range up to about 3% of the dairy base mix.

The dairy base mix further essentially comprises a calcium sequestrant in amounts sufficient to prevent premature precipitation of the protein content in the dairy base mix. By premature protein precipitation is meant any protein coagulation during the heating or pasteurization or cooling steps to be described. It is desirable that thickening of the dairy product occurs after the heat treatment such as during the fermentation step.

Suitable soluble calcium or sequestrants to use are sodium or potassium citrates (e.g., trisodium citrate), phosphates, acetates, tartrates, malates, fumarates, adipates, ascorbates and mixtures thereof. Especially preferred for use herein as the sequestrant is a mixture of sodium citrate and sodium hexametaphosphate in a 15–20:1 weight ratio.

Generally, the amount of sequestrant will depend upon the amount of cultured dairy ingredient. Good results are obtained when the cultured dairy ingredient to sequestrant(s) ratio ranges for example, about 1.5:1 to about 10:1, preferably about 2:1 to about 4:1.

The dairy base ingredients are admixed to form an homogeneous or well blended mix. Next, the dairy base mix 11 is optionally homogenized 12 in a conventional homogenizer to disperse evenly the added materials and the fat component supplied by various ingredients thereby forming an homogenized dairy base mix 13. If desired, the dairy base mix 11 can be warmed prior to homogenization from typical milk storage temperatures of about 5° C. to temperatures of about 65 to 75° C., preferably about 71° C.

This homogenized dairy base mix 13 is then essentially heat treated or pasteurized 14, typically by heating for times and temperatures effective to accomplish pasteurization to form a pasteurized or heat treated dairy base mix or blend 15. As is well known, the dairy base mix 11 can be heated to lower temperatures for extended times, e.g., 88° C. for 30 minutes, or alternately to higher temperatures, e.g., 95° C., for shorter times, e.g., for about 38 seconds. Of course, intermediate temperatures for intermediate times can also be employed. Other pasteurization techniques or, less preferably, even sterilization, can be practiced (e.g., light pulse, ultra high temperature, ultra high pressure, etc.) if effective and economical. In certain commercial practices, the sequence of the homogenization and pasteurization steps can be reversed.

It is an advantage of the present invention that protein precipitation is minimized even though the pasteurized dairy base mix is high in total calcium content by virtue of the neutralized cultured dairy ingredient. The pasteurized dairy base mix so prepared finds particular suitability for use in the preparation of a cultured or fermented dairy product. If desired, the pasteurized dairy base mix is a useful intermediate product for such cultured dairy products or for other dairy products that are not cultured, e.g., gelled dairy products such as puddings especially those gelled with starch.

Especially preferred herein is a pasteurized dairy base mix comprising a dairy base having a moisture content of about 70 to 85% and a pH of about 6.0 to 6.6 and comprising about 0.05 to 3% of a cultured dairy ingredient wherein the cultured dairy ingredient has a calcium content of about 10 to 25%. The pasteurized dairy base further includes a calcium sequestrant on a weight ratio of cultured dairy ingredient to sequestrant of about 1.5:1 to 10:1, preferably about 2:1 to 4:1. In more preferred embodiments, the dairy base includes a propionic acid content of about 0.025 to 0.15%.

In the present preferred methods, the homogenized and pasteurized dairy base mix is then brought to incubation temperature, usually about 40 to 46° C. When heat pasteurization is employed, this step typically is followed by a cooling step 16.

Thereafter, the homogenized and pasteurized dairy blend mix is inoculated with a desired starter culture 18 such as a starter yogurt culture in the preferred method. Usually, a yogurt starter culture includes a combination of *Lactobacillus bulgaricus* and *Streptococcus thermophilus*. In other variations, the yogurt culture can additionally include a *Lactbacillus bifidus* or a *Lactbacillus acidophilus* bacteria. Of course, in the preparation of other cultured dairy products, e.g., sour cream, kefir, cottage cheese, appropriate starter cultures are added.

The present methods further comprise a fermentation step 20. In the preferred preparation of yogurt herein, the fermentation step 20, is quiescently continued until the pH of the inoculated dairy base mix blend reaches approximately 4.2 to 4.6 to form a yogurt base 21. Depending upon temperature and amount of culture added, this may take from about three to about 14 hours. In the preparation of a stirred style yogurt product, it is important that the mixture not be agitated during the fermentation process to allow proper curd formation. When the proper pH has been reached, the yogurt is cooled 22 (e.g., to about 2 to 21° C.) to arrest further growth and any further drop in the pH to form a cooled yogurt base 28.

The yogurt base 28 thus prepared importantly is characterized by a viscosity of at least 1500, preferably at least 2300 cps (at 5° C). Yogurt viscosities can range up to 45000 cps.

If desired, the yogurt base 28 can be fortified with additional calcium. A good description of useful calcium fortification techniques is given in U.S. Pat. No. 5,820,903 (issued Oct. 13, 1998 to Fleury et al. entitled "Calcium Fortified Yogurt and Methods of Preparation" which is incorporated herein by reference).

In certain embodiments, particularly low fat and/or low calorie variations, the yogurt product herein comprises a high potency non-nutritive carbohydrate sweetening agent. Exemplary high potency sweeteners include aspartame, sucrose, potassium acelsufame, saccharin, cyclamates, thaumatin and mixtures thereof. Especially preferred for use herein is aspartame. If aspartame is employed, an aqueous dispersion thereof can be prepared and added to the yogurt base. The aspartame is preferably added separately from the calcium slurry since aspartame tends to degrade under the processing conditions of the slurry preparation.

If desired, various flavors can be added with or in a manner similar to the aspartame dispersion (not shown). Illustrative flavors include vanilla, chocolate, amaretto cheesecake, white chocolate, Boston cream pie, CaféAu Lait, caramel apple, banana cream pie and mixtures thereof.
Optional Ingredients If desired, the yogurt can additionally include a conventional fruit sauce or puree. If present, the fruit constituent can comprise about 5 to about 15% of the yogurt product. The present method thus can comprise the optional additional step of adding a fruit sauce or puree 50.

In the manufacture of Swiss-style yogurt, a fruit flavoring is blended substantially uniformly throughout the yogurt after fermentation is complete but prior to packaging. A static mixer 54 can be used to blend the fruit sauce into the yogurt with minimal shear.

In the manufacture of "sundae" style yogurt, fruit flavoring is deposited at the bottom of the consumer container, and the container is then filled with the yogurt mixture. To prepare a sundae style yogurt product employing a stirred style yogurt, the milk base is prepared with added thickeners and/or stabilizers to provide upon resting a yogurt texture that mimics a "set" style yogurt. In this variation, the fruit is added directly to the container, typically to the bottom, prior to filling with the yogurt.

The fruit flavoring sauce or puree used in the invention may be any of a variety of conventional fruit flavorings commonly used in yogurt products. Typical flavorings include strawberry, raspberry, blueberry, strawberry-banana, boysenberry, cherry-vanilla, peach, pineapple, lemon, orange and apple. Generally, fruit flavorings include fruit preserves and fruit or fruit puree, with any of a combination of sweeteners, starch, stabilizer, natural and/or artificial flavors, colorings, preservatives, water and citric acid or other suitable acid to control the pH. Minor amounts (e.g., providing less than 50 mg of calcium per 226 g serving) of calcium can be added to the fruit to control the desired texture of the fruit preparation typically provided by a soluble calcium material such as calcium chloride.

If aspartame is added to the yogurt base, all or a portion of the aspartame can be pre-blended with the fruit flavoring.

If desired, the dairy base mix can be formulated with thickeners and setting agents that will set up after cup filling that will impart a texture to the yogurt that mimics a set-style type yogurt product.

The products can additionally include a variety of other ingredients to increase their nutritional, organoleptic or other consumer appeal, e.g., fruit pieces, nuts, partially puffed cereals, etc.

Preferably, the yogurt is unaerated. That is, the yogurt phase(s) can have a density of from about 0.9 to 1.2 g/cc. However, in other variations the yogurt can be aerated to about 0.5 to 0.8 g/cc, especially for soft serve frozen yogurt products.

The yogurt or other cultured dairy product with or without fruit (whether blended with the yogurt base or as a separate phase) is then charged to a conventional container such as a coated paper or plastic cup. After filling, the filled containers are applied with a lid or other closure, assembled into cases and entered into refrigerated storage for distribution and sale.

DESCRIPTION OF FINISHED PRODUCT ATTRIBUTES

The present invention provides both fermented dairy products and methods for addition of antimycotic cultured dairy ingredient such as yogurt products. The resulting yogurt has an acceptable texture and flavor.

While the invention finds particular suitability for a connection with yogurt, the skilled artisan can appreciate that the invention can also be used in connection with other fermented dairy products such as sour cream and kefir. Also, non-fermented dairy products can be prepared, e.g., starch gels (puddings), frozen desserts, cheeses (e.g., processed cheese) containing the cultured dairy ingredient. In such non-cultured dairy products that rely upon gelling or thickening ingredients. Additional soluble calcium may be needed to increase gelation to overcome the residual affect of the added calcium sequestrant.

What is claimed is:

1. A process for preserving a cultured dairy food product against spoilage yeast, the process comprising the step of providing in a food product, that (a) is normally devoid of Propionibacterium, (b) contains less than 50% solids, and (c) is subject to spoilage by yeast, a metabolite-containing material that is produced by a culture of Propionibacterium and that contains metabolites other than propionic acid, the material being present in an amount sufficient that the metabolite inhibits the growth of the spoilage yeast and that the material provides less than 0.3% propionic acid in the food product and a calcium sequestrant in weight ratio of material to sequestrant ranging from about 1.5:1 to 10:1.

2. The process of claim 1 wherein the cultured dairy product is prepared to a total calcium content of at least 10%.

3. The process of claim 1 wherein the calcium sequestrant is selected from the group consisting of sodium hexametaphosphate, sodium citrate, disodium phosphate, sodium triphosphate, long chained polyphosphates, and mixtures thereof.

4. The process of claim 3 wherein the calcium sequestrant comprises sodium hexametaphosphate.

5. The process according to claim 1 wherein the weight ratio of material to sequestrant ranges from 2:1 to about 4:1.

* * * * *